United States Patent [19]
Myers et al.

[11] 3,727,516
[45] Apr. 17, 1973

[54] CUSHIONED VALVE PLUNGER

[75] Inventors: Lawrence R. Myers; John J. Lakovits, both of South Bend, Ind.

[73] Assignee: The Bendex Corporation, South Bend, Ind.

[22] Filed: June 7, 1971

[21] Appl. No.: 150,326

[52] U.S. Cl....................................91/376, 91/369 A
[51] Int. Cl...................................................F15b 9/10
[58] Field of Search ........................91/369 A, 369 B, 91/369 R, 376

[56] References Cited

UNITED STATES PATENTS

| 3,026,853 | 3/1962 | Stelzer | 91/369 B |
| 3,082,745 | 3/1963 | Brooks | 91/369 B |
| 3,172,335 | 3/1965 | Brooks et al. | 91/369 B |
| 3,452,646 | 7/1969 | Abbott et al. | 91/369 A |
| 3,517,588 | 6/1970 | Kytta | 91/369 A |

Primary Examiner—Paul E. Maslousky
Attorney—Leo H. McCormick, Jr.

[57] ABSTRACT

A plunger member slidably retained along an axial line in a central bore of a hub member by guiding surfaces for controlling the flow of an operational fluid. In response to an operator supplied input, the plunger member moves on the guiding surfaces in the central bore. An annular stop on the plunger member limits the movement of the plunger member in one direction by engaging a portion of the housing of the hub member. A resilient member positively retained in the plunger member adjacent the annular stop provides a cushioning surface in which noise between the plunger member and the hub member is absorbed.

2 Claims, 3 Drawing Figures

PATENTED APR 17 1973 3,727,516

*INVENTORS*
LAWRENCE R. MYERS
JOHN J. LAKOVITS
BY
Leo H. McCormick Jr.
ATTORNEY 3,727,516

CUSHIONED VALVE PLUNGER

BACKGROUND OF THE INVENTION

In normal brake applications in vehicles having a power assist servomotor for operating the brakes, the operator will gently activate the servomotor to bring the vehicle to a uniform deceleration or stop. However, if the servomotor is suddenly activated with sufficient force, the valve controlling the operational fluid will be pushed to the bottom of a bore in the servomotor. When the valve contacts the bottom of the bore, a "clunk" will occur giving the operator the impression a malfunction has occurred to the servomotor.

SUMMARY OF THE INVENTION

Through our invention we have devised a means to attenuate noise transmitted between a servomotor and an actuator controlled by an operator. The servomotor has a central bore for retaining a valve plunger connected to the actuator means. The valve plunger has a plurality of guiding surfaces to maintain axial alignment in the central bore with an output transmitting rod. An annular stop on the valve plunger limits the distance the actuator means can move the valve plunger in the central bore. A resilient means is positively retained on an external flange of the valve plunger adjacent the annular stop. The resilient means has a portion which overlaps the annular stop to provide a cushioning surface in which the force exerted by the actuator to move the valve plunger is initially absorbed before termination by the annular stop. When the resilient means is in contact with the bottom of the central bore, any noise between the servomotor and the actuator means will be absorbed, thereby preventing an unwarranted impression that a malfunction has occurred in the servomotor.

It is the object of this invention to provide a servomotor with resilient means for absorbing any noise created therein.

It is another object of this invention to provide a cushioning means between a valve plunger and the bottom of a bore in a hub of a servomotor for initially absorbing an impact force and thereby reducing the noise caused by the valve plunger contacting the bottom of the bore.

It is still another object to provide a valve plunger with a sound absorbing means which is positively retained in a lapping position over an annular stop on the valve plunger.

These and other objects will become apparent to those skilled in this art from reading the specification and viewing the drawings.

DETAILED DESCRIPTION OF THE PREFERRED EMBODIMENT

Figure 1:
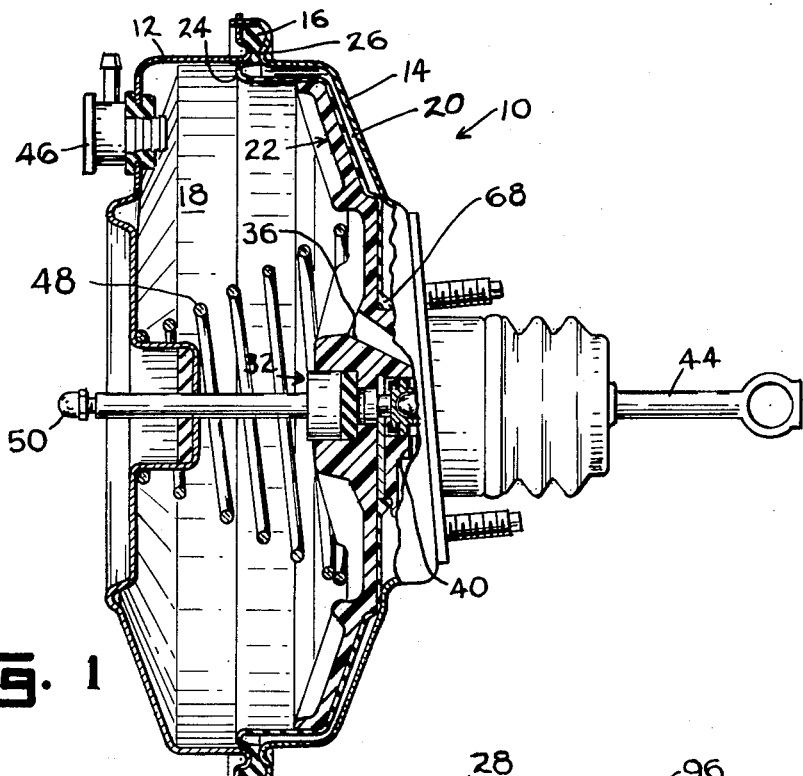
FIG. 1 is a sectional view of a servomotor having resilient means for absorbing noise generated between an actuator and an interior movable wall.

A servomotor 10 shown in FIG. 1 has a front shell 12 and a rear shell 14 joined together by a twist lock connector 16 to create a sealed cavity. The cavity is divided into a front chamber 18 and a rear chamber 20 by wall means 22. Partial vacuum from the intake manifold (not shown) of a vehicle is communicated to the front chamber 18 through check valve 46. Wall means 22 has a diaphragm 24 with an outer periphery 26 retained by the twist lock connector 16 and an inner periphery 28 which is retained in a groove 30 of a hub means 32.

Hub means 32 has a tubular boss 34 located in the rear chamber 20 which extends through and is slidably retained in the rear shell 14. The hub means 32 has a first passage 36 connecting the front chamber 18 to a central bore 38 in the tubular boss 34. A second passage 40 connects the central bore 38 to the rear chamber 20. Control valve means 42 will permit the partial vacuum communicated to the front chamber access to the rear chamber to suspend the wall means 22.

The control valve means 42 is responsive to a valve rod 44 operated by an operator. Upon actuation of the valve rod 44 by the operator, communication of partial vacuum between the front chamber 18 and the rear chamber through the central bore 38 will be interrupted by movement of the control valve means 42. When the partial vacuum in the central bore is interrupted, air under atmospheric pressure will be communicated through the central bore to the second passage 40 and into the rear chamber 20. With air under atmospheric pressure in the rear chamber 20 and partial vacuum in the front chamber 18, a pressure differential will be produced across the wall means 22. The pressure differential will cause the wall means 22 to overcome resilient means 48 and transmit an output force to the push rod 50 for engaging a master cylinder (not shown). Movement of the control valve means 42 in the central bore 38 is limited by an annular stop 54 on the valve plunger means 52. A resilient means 80 is positively retained on the valve plunger means 52 to initially engage the housing of the hub means 32 at the bottom of the central bore 38. The resilient means 80 will absorb any noise created between the valve plunger means 52 and the bottom of the central bore 38 to provide a quiet operating servomotor 10.

In more particular detail, the valve plunger means 52 located in the central bore 38 has a first guiding surface 58 carried in an opening 60 of the hub means 32 attached to an annular body 62 by a stem 64. The stem 64 is of a smaller diameter than the annular body 62. A shoulder 56 larger in diameter than opening 60 forms part of the annular stop 54. A second guiding surface 66 surrounds the annular body 62 and maintains the valve plunger means 52 in axial alignment with the output rod 50. A flange 68 adjacent stop 54 has a front face 70 and a rear face 72 with a peripheral surface 74 parallel to the central bore 38. The front face 70 and the peripheral surface 74 form a first sharp edge 76 and the rear face 72 and the peripheral surface 68 form a second sharp edge 78. A u-shaped annular resilient means 80 has a first leg 82 and a second leg 84 separated by a spacer 86 of the same width as the peripheral surface 74. The inner diameter of the u-shaped annular resilient means 80 is equal to the diameter of the annular body 62. The u-shaped annular body is snapped over flange 68 to form a snug fit with the annular body 62. A portion of the front leg 82 extends past the annular stop 54 to provide a cushioned impact on the retainer key 85 which holds the plunger means 52 in the central bore 38. A spherically shaped bottom 88 in bore 90 receives a spherical end 92 of the valve rod 44 to provide self-alignment between the input valve rod 44 and the valve plunger means 52 in a manner fully described in U. S. application Ser. No. 128,754 filed Mar. 29, 1971 and incorporated herein by reference. A rearwardly facing annular atmospheric valve seat 94 surrounds the bore 90 for sealing with a flexible annular rubber poppet member 96. The annular rubber poppet member 96 surrounds a matching tube 98 which transmits an actuation force to seat the poppet member 96 on seat 94. The poppet member 96 has an integral flexible diaphragm portion 100 with a radial outer periphery 102 which is enlarged and held against the central bore 38 by annular spring retainer 104. The annular poppet member 96 is biased against the atmospheric valve seat 94 by a coil spring 106 that acts on flange 108 and shoulder 110. The control valve means 42 is retained in the deactivated position shown in FIGS. 1 and 2 by return spring 112 positioned between a retainer 114 held on valve rod 44 by shoulder 110 and spring retainer 104.

MODE OF OPERATION OF THE PREFERRED EMBODIMENT

Figure 2:
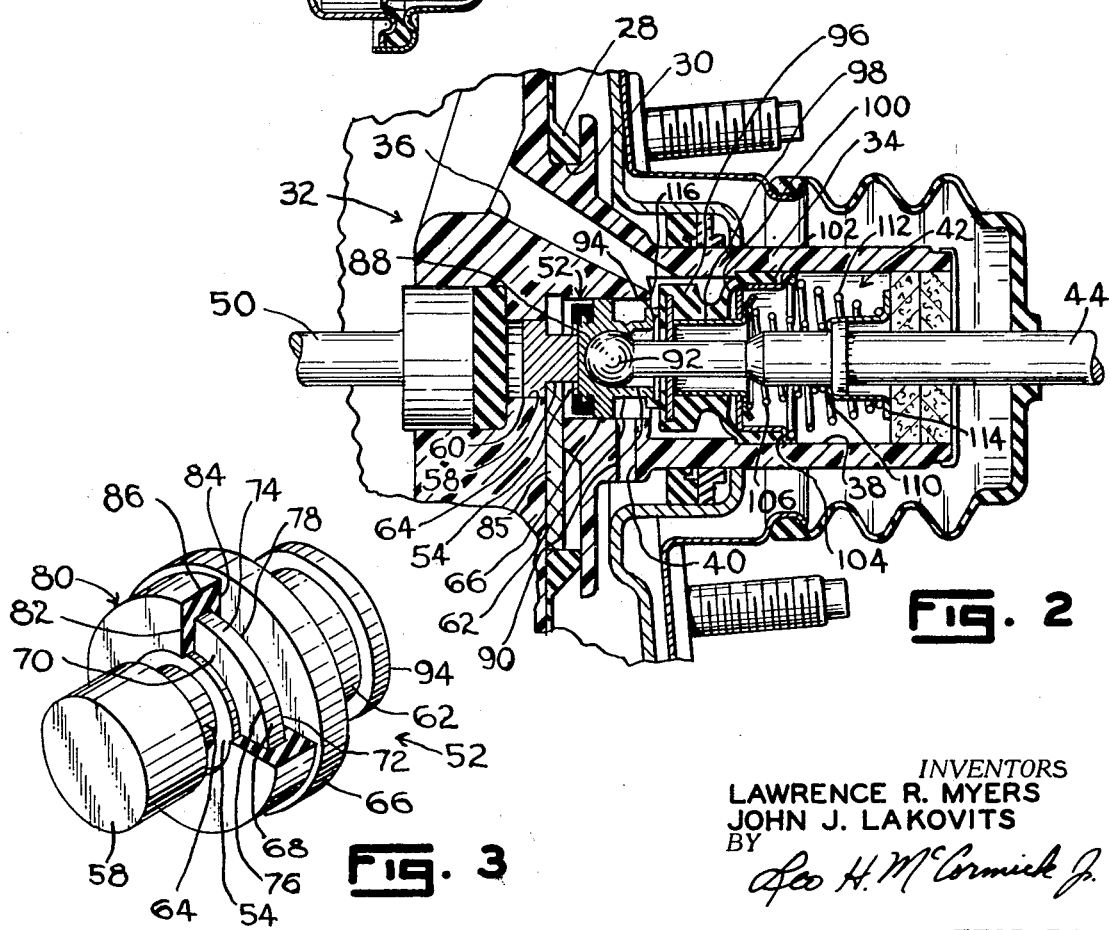
FIG. 2 is an enlarged sectional view of the actuator positioned in a central bore of the interior movable wall in the rest position.
Figure 3:
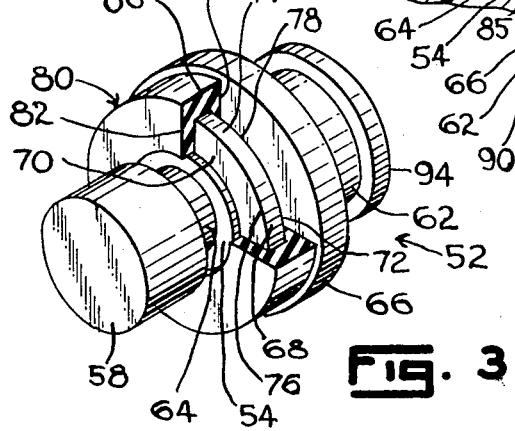
FIG. 3 is a perspective view of a valve plunger having a resilient means positively secured adjacent an annular stop for absorbing initial impact and noise between the housing of the wall and the valve plunger.

Upon actuation of the valve rod 44 by an operator, the valve rod 44 slides, to the left as shown in FIG. 2, the valve plunger means 52 on its first and second guiding surfaces 58 and 66 in the central bore 38. As the valve plunger means 56 moves, the flexible rubber poppet 96 first seats on shoulder 116 to close the communication between the first passage 36 and central bore 38 to prevent the partial vacuum from entering the rear chamber 20. Upon further movement of the plunger means 52 by the valve rod 44, valve face 94 moves away from the annular poppet 96 to permit atmospheric pressure access to chamber 116 from whence it flows through the second passage to the rear chamber 20 to create the operational pressure differential across the wall means 22 to provide the operational power to move the output rod 50 connected to a servomotor.

Upon still further movement of the plunger means 52, the front leg 82 of the u-shaped resilient means 80 will contact the retainer key 85 located in the central bore 38 to cushion the impact with the annular stop 54. When impact between the annular stop 54 and the bottom 86 occurs the u-shaped resilient means will absorb the noise created and continue to attenuate any noise transmitted through the servomotor to the plunger means 56 to assure quiet operation of the servomotor.

We claim:

1. A servomotor comprising:
a housing having a sealed cavity;
wall means dividing said cavity into a front chamber and a rear chamber, said front chamber being connected to a source of partial vacuum;
hub means secured to said wall means and slidably retained in said rear chamber, said hub means having a central bore connected to the front chamber by a first passage and to the rear chamber by a second passage, said partial vacuum being communicated through said first passage into said central bore and into said rear chamber by said second passage to vacuum suspend said wall means;
valve means plunger means slidably located in said central bore, said plunger means having an annular body with an interior bore, said interior bore having a spherically bottom for receiving a spherical member on the end of a force transmitting rod attached to an actuator means, said plunger means having a first guiding surface carried by said hub means adjacent an annular stop for limiting the movement of said plunger means with respect to said hub means, said annular body having an annular projection with a diameter substantially equal to a diameter of said central bore in said hub means, said annular projection forming a second guiding surface, said first and second guiding surfaces maintaining said plunger means in axial alignment within said central bore of said hub means, said plunger means having an annular flange with a front face and a rear face extending from said annular body between the first and second guiding surfaces, said front face and rear face terminating in a peripheral surface parallel to said annular body to form said annular flange, said peripheral surface and said front face forming a first sharp edge and said peripheral surface and said rear face forming a second sharp edge;
key means located in said hub means between said first guide surface and said annular stop for positioning and limiting the movement of said plunger means in said central bore;
said actuator means responsive to an operator for moving said plunger means in said central bore from a deactivated position to an actuation position for closing the first passage communicating partial vacuum to the central bore and opening the second passage to atmospheric pressure creating a pressure differential across the wall means, said pressure differential causing the wall means to move and transmit an output force; and
resilient means having a first leg and a second leg separated by a spacer, said spacer being equal to the width of said annular flange, said first and second sharp edges engaging said first and second legs to rigidly hold said resilient means on said plunger means adjacent said annular stop, said first leg of said resilient means extending past said annular stop, said first leg initially engaging said key means before said annular stop to provide a sound absorbing cushion between the hub means and the plunger means upon the operator moving the plunger means into a movement limited position with said key means.

2. The servomotor as recited in claim 1 wherein said first leg, spacer, and said second leg are united to form an annular resilient member having a U-shaped cross section, said annular resilient member having an inner diameter equal to the outer diameter of said annular body of said plunger means, said U-shaped annular member being snapped over said annular flange to form a tight fit between said annular body, the annular rib and the U-shaped annular resilient member.

* * * * *